United States Patent
Salter et al.

(10) Patent No.: US 9,802,545 B1
(45) Date of Patent: Oct. 31, 2017

(54) MOTOR VEHICLE ICE SENSOR ASSEMBLY AND METHOD OF OPERATION

(71) Applicant: Ford Global Technologies, LLC, Dearborn, MI (US)

(72) Inventors: Stuart C. Salter, White Lake, MI (US); Annette Lynn Huebner, White Lake, MI (US); Paul Kenneth Dellock, Northville, MI (US); James J. Surman, Clinton Township, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/408,846

(22) Filed: Jan. 18, 2017

(51) Int. Cl.
| B60R 3/00 | (2006.01) |
| B60Q 1/00 | (2006.01) |
| B60Q 1/32 | (2006.01) |
| H05B 3/42 | (2006.01) |

(52) U.S. Cl.
CPC ............ B60R 3/002 (2013.01); B60Q 1/0023 (2013.01); B60Q 1/323 (2013.01); B60R 3/007 (2013.01); H05B 3/42 (2013.01); *H05B 2214/02* (2013.01)

(58) Field of Classification Search
CPC ..................................................... B60R 3/002
See application file for complete search history.

(56) References Cited

U.S. PATENT DOCUMENTS

| 2,501,819 | A | | 3/1950 | Kloepper | |
| 4,222,044 | A | * | 9/1980 | Boschung | G08B 19/02 244/134 R |
| 4,996,493 | A | * | 2/1991 | Monat | B64D 15/20 324/693 |
| 6,140,609 | A | | 10/2000 | Jones | |
| 6,659,629 | B2 | | 12/2003 | Potter et al. | |
| 7,017,927 | B2 | | 3/2006 | Henderson et al. | |
| 7,044,487 | B2 | | 5/2006 | Byrne | |
| 7,358,858 | B2 | * | 4/2008 | Ozawa | G01K 11/3206 250/227.17 |
| 8,235,568 | B2 | | 8/2012 | Héiden et al. | |
| 2005/0206522 | A1 | * | 9/2005 | Leyden | G08B 13/1463 340/568.4 |
| 2015/0197180 | A1 | | 7/2015 | Salter et al. | |

* cited by examiner

*Primary Examiner* — John Walters
*Assistant Examiner* — James Triggs
(74) *Attorney, Agent, or Firm* — Jason Rogers; Price Heneveld LLP

(57) ABSTRACT

A frozen accumulation detection assembly and method of operation for a motor vehicle is provided. The assembly includes a light source for emitting light on a surface of the motor vehicle, such as running board, and a sensor for measuring a reflectance level of the light off of the surface of the motor vehicle. The assembly further includes a heating element coupled to the surface of the motor vehicle. The reflectance level may be used as an indicator of frozen accumulation on the surface of the motor vehicle, and may help determine if the heating element should be energized.

20 Claims, 12 Drawing Sheets

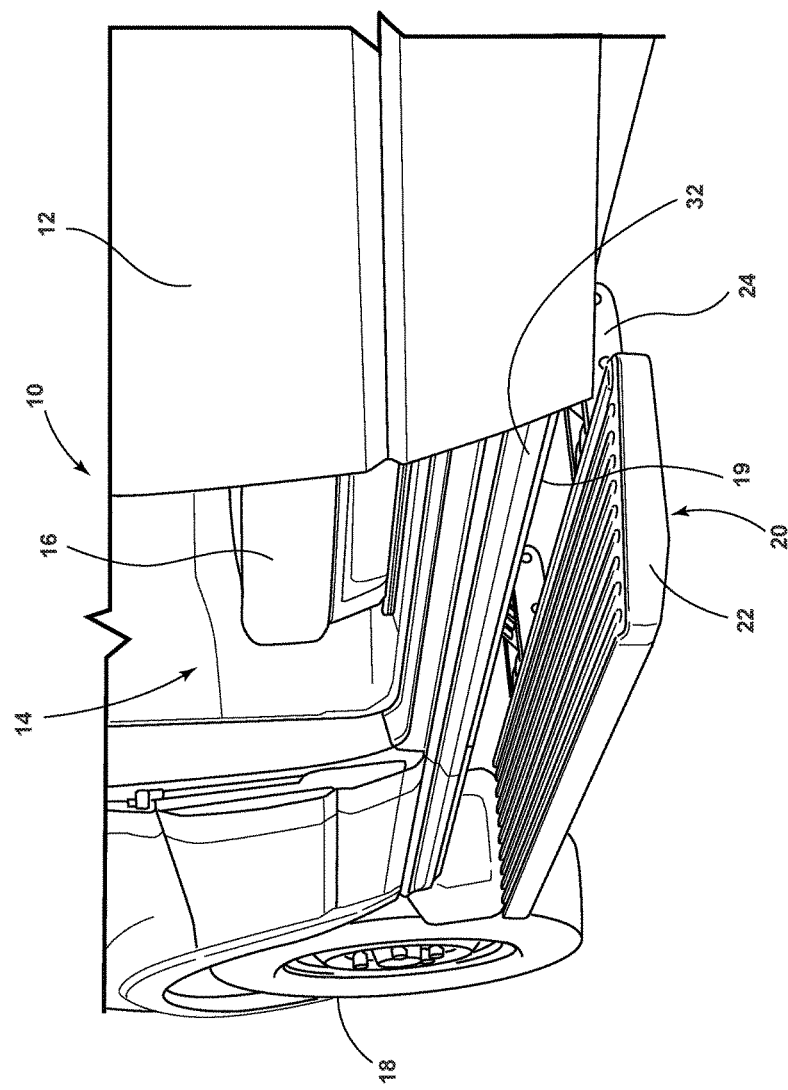

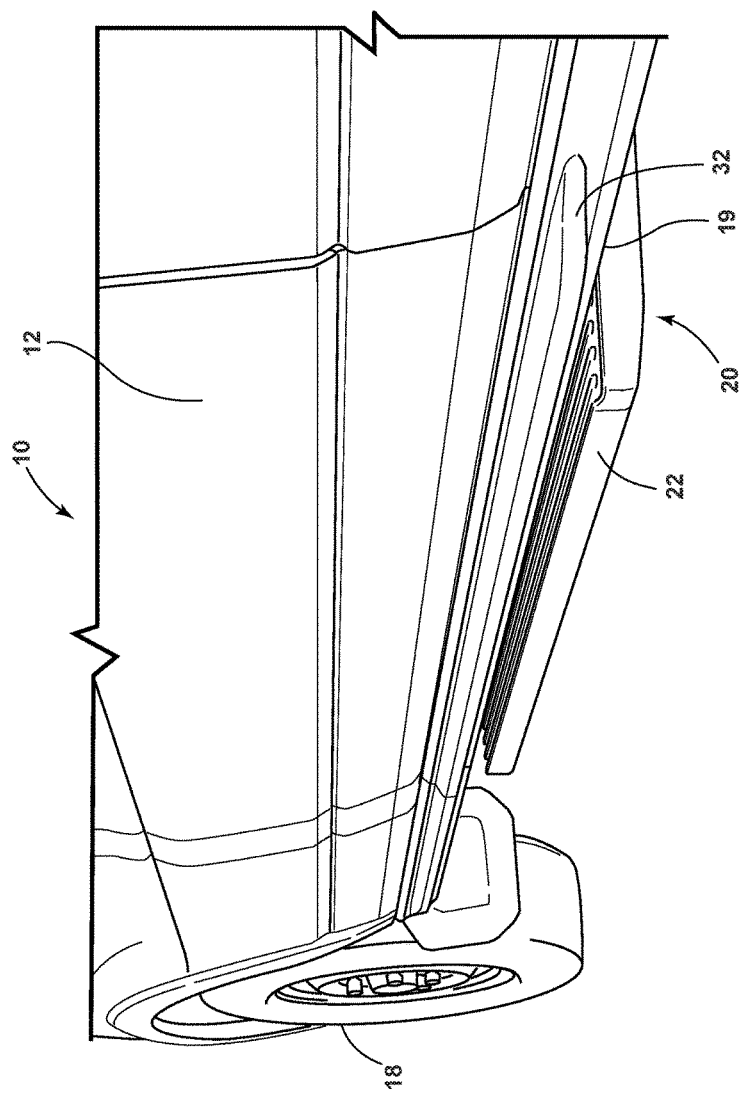

MOTOR VEHICLE ICE SENSOR ASSEMBLY AND METHOD OF OPERATION

FIELD OF THE INVENTION

The present invention generally relates to a system and method for detecting ice on a surface of a motor vehicle, such as a running board.

BACKGROUND OF THE INVENTION

Motor vehicles are commonly equipped with running boards along an entry area of the motor vehicle to assist a passenger with entering and exiting the motor vehicle. In some motor vehicles, the running boards are permanently attached to a side of the motor vehicle and in other configurations they may be deployed when a door of the motor vehicle is opened. In both cases, however, because they are on an exterior of the motor vehicle, they are subject to weather and other elements. For instance, they may become covered with dirt, they may become wet, or they may become ice-covered in certain weather situations.

SUMMARY OF THE INVENTION

According to one aspect of the present invention, a running board assembly for a motor vehicle is provided. The running board assembly includes a running board, a heating element coupled to the running board, a light source for emitting light on a surface of the running board, and a light sensor for measuring a reflectance level of the emitted light off the surface of the running board.

According to another aspect of the present invention, a system for detecting frozen accumulation on a surface of a motor vehicle is provided. The system includes a light source configured to emit light on the surface of the vehicle and a light sensor configured to measure a reflectance level of the emitted light off of the surface of the vehicle.

According to yet another aspect of the present invention, a method for preventing frozen accumulation on a surface of a motor vehicle is provided. The method provides instructions to emit light on the surface of the motor vehicle. Next, the method includes receiving a measurement of a reflectance level of the light off of the surface of the motor vehicle. The method then compares the measured reflectance level to a threshold reflectance level. When the measured reflectance level is greater than the threshold reflectance level, the method includes providing instructions to energize a heating element proximate the surface of the motor vehicle.

These and other aspects, objects, and features of the present invention will be understood and appreciated by those skilled in the art upon studying the following specification, claims, and appended drawings.

BRIEF DESCRIPTION OF THE DRAWINGS

Further advantages and features according to the present disclosure will become clear from the following detailed description provided as a non-limiting example, with reference to the attached drawings. The components in the drawings are not necessarily to scale, emphasis instead being placed upon illustrating the principles of the embodiments in which:

FIG. 1A is a side-perspective view of a portion of a motor vehicle having a running board in an extended position, according to an embodiment of the present disclosure;

FIG. 1B is another side-perspective view of a portion of a motor vehicle having a running board in a retracted position, according to the embodiment;

DETAILED DESCRIPTION OF THE PREFERRED EMBODIMENTS

Figure 2:
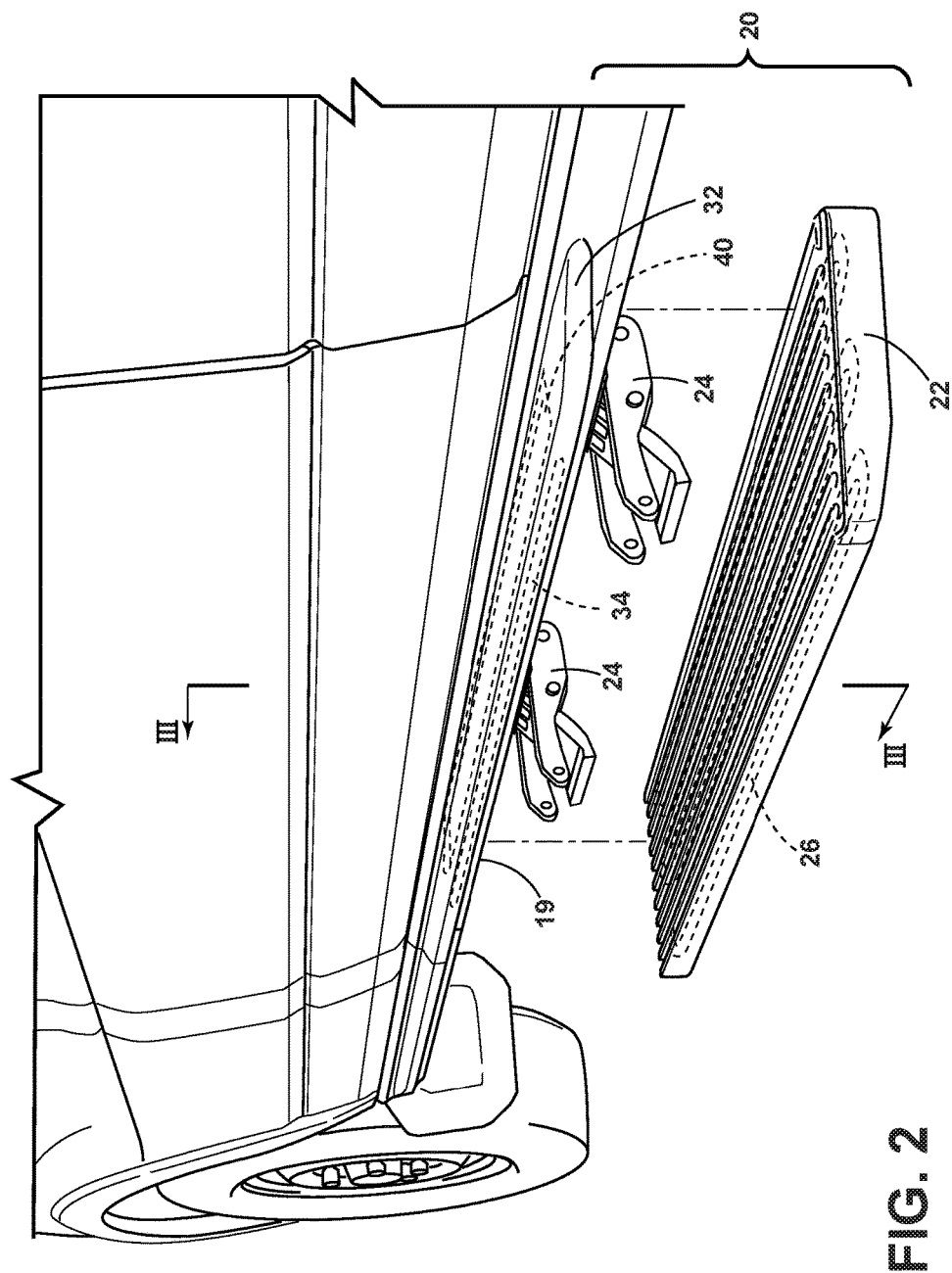
FIG. 2 is a side-perspective view of a portion of a motor vehicle showing an exploded running board assembly, according to the embodiment.

FIGS. 1A-2 and 7 depict various views of an embodiment of motor vehicle 10. The term "motor vehicle" as used throughout this detailed description and in the claims refers to any moving vehicle that is capable of carrying one or more human occupants and is powered by any form of energy. The term "motor vehicle" includes, but is not limited to: cars, trucks, vans, minivans, SUVs, motorcycles, scooters, boats, personal watercraft, and aircraft.

The present illustrated embodiments reside primarily in combinations of apparatus components and method steps related to an ice sensor assembly for a motor vehicle. Accordingly, the apparatus components and method steps have been represented, where appropriate, by conventional symbols in the drawings, showing only those specific details that are pertinent to understanding of the embodiments of the present disclosure. Further, like numerals in the description and drawings represent like elements. It will be understood that in other embodiments some of the components may be optional, and in still other embodiments, other arrangements of the components may be used and are contemplated herein as would be understood by a skilled artisan.

For purposes of description, directional terms used herein shall relate to the disclosure as oriented in FIG. 1A. However, the disclosure may assume various alternative orientations, except where expressly specified to the contrary. It is also to be understood that the specific devices and processes illustrated in the attached drawings, and described in the following specification are simply exemplary embodiments of the concepts defined in the appended claims. Hence, specific dimensions and other physical characteristics relating to the embodiments disclosed herein are not to be considered as limiting, unless the claims expressly state otherwise.

For purposes of this disclosure, the term "coupled" (in all of its forms, couple, coupling, coupled, etc.) generally means the joining of two components directly or indirectly to one another. Such joining may be stationary in nature or movable in nature. Such joining may be achieved with the two components and any additional intermediate members being integrally formed as a single unitary body with one another or with the two components. Such joining may be permanent in nature or may be removable or releasable in nature unless otherwise stated.

The present disclosure provides a system and method for detecting, and in some cases preventing, frozen accumulation, such as ice, sleet or snow, on a surface of a motor vehicle. According to embodiments described herein, the system may include a light source for emitting light on the surface of the motor vehicle and a light sensor for measuring a reflectance level of the emitted light off of the surface of the motor vehicle. When the level or percentage of reflected light is high, or above a pre-determined threshold, indicating the presence of frozen accumulation, a heating element associated with the surface of the motor vehicle may be used to melt the frozen accumulation. In at least one embodiment, the system and method may be used to detect and prevent frozen accumulation on a top surface of a running board, such as running board 22 of motor vehicle 10, as shown in FIGS. 1A and 1B and described in more detail below. In other cases, the system and method may be used to detect and prevent frozen accumulation on any other surface of a motor vehicle where ice accumulation can present a hazard or effect operation of the motor vehicle.

FIGS. 1A and 1B generally illustrate a portion of a motor vehicle 10 having a running board assembly 20. In some cases, motor vehicle 10 represents a motor vehicle with a high clearance relative to the ground such that assistance with entry and exit to motor vehicle 10 is required. Motor vehicle 10 is illustrated as having a door 12, which may open to allow access by one or more passengers to a passenger compartment 14. In the partial depiction of motor vehicle 10, passenger compartment 14 may include a driver's seat 16 for seating the driver, as well as a steering wheel, instrument console and other components customarily found within a motor vehicle passenger compartment (not shown). Externally, as shown in the illustration of motor vehicle 10, a rear wheel assembly 18 is depicted. It should be appreciated that the depiction of motor vehicle 10 is only exemplary and has only been represented to the degree pertinent to understanding of the present disclosure, and therefore may include other features or embodiments as would be known to a person skilled in the art, but not shown.

In some cases, motor vehicle 10 may include provisions to assist with entry and exit into passenger compartment 14. Entry and exit may be by way of a step mounted on motor vehicle 10, such as a running board, or other surface that can assist with passenger entry and exit and support a passenger thereon. In one embodiment, a running board assembly 20 disposed proximate a lower outer surface 19, or otherwise proximate a shoulder 32 of motor vehicle 10, and includes a running board 22. In at least one case, running board 22 is configured to extend into a deployed position when a passenger door 12 is opened as shown in FIG. 1A, and to retract into a stowed position when passenger door 12 is closed as shown in FIG. 1B.

Figure 3:
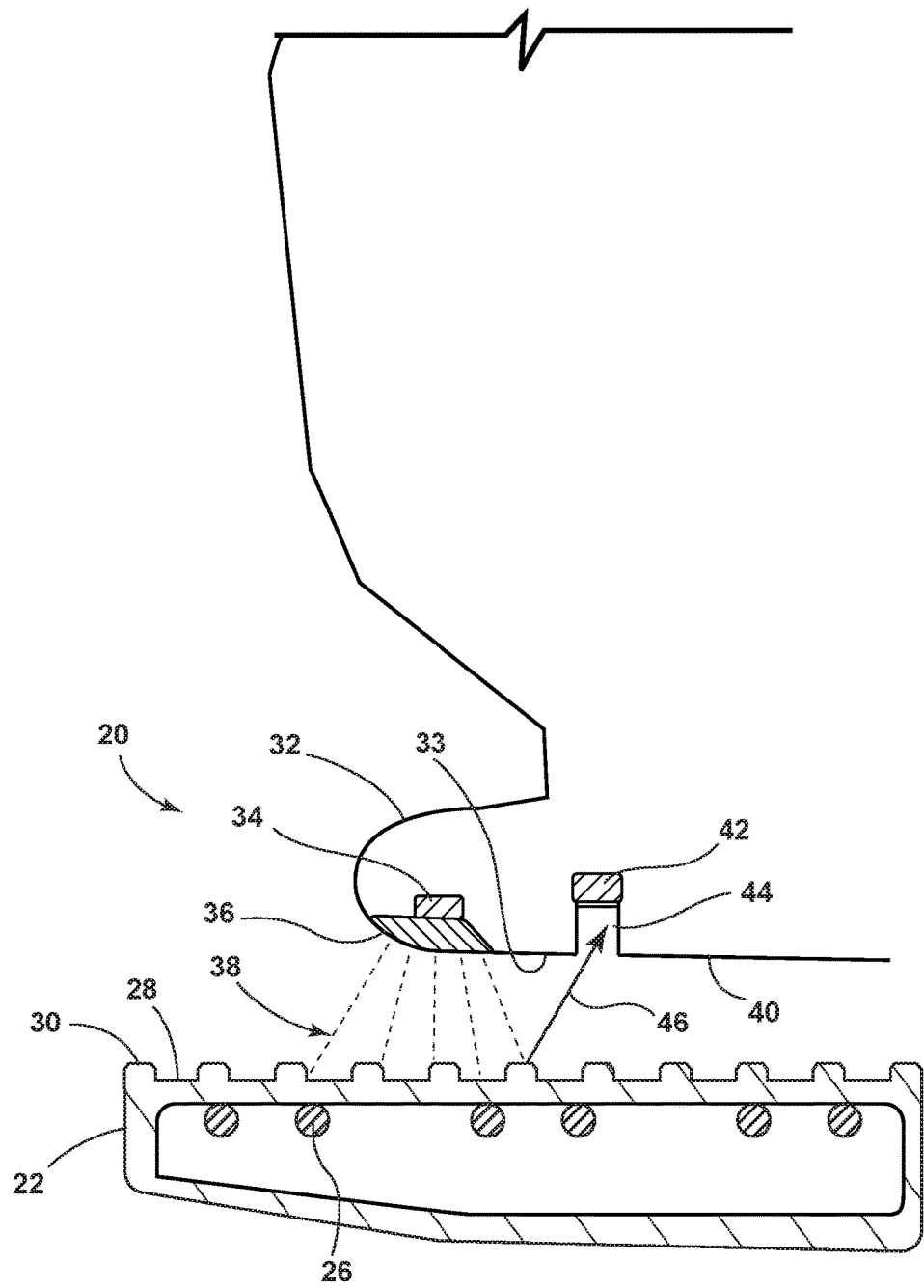
FIG. 3 is a cross-sectional view of a running board assembly according to the embodiment.

FIGS. 2 and 3 depict running board assembly 20 according to at least one embodiment of the present disclosure. More specifically, FIG. 2 depicts an exploded view of various elements of a running board assembly 20. FIG. 3 depicts a cross-section of running board assembly 20 as taken across line III in FIG. 2. As shown in FIGS. 2 and 3, running board assembly 20 may include a running board 22 provided as a step for entry and exit to motor vehicle 10. In the illustrated embodiment, running board 22 is configured as a long rectangular surface that is able to support a passenger's weight, and disposed along an entry and exit area of a vehicle compartment. Running board 22 may include a top surface 28 having one or more projections 30 to provide traction on top surface 28 of running board 22.

Running board 22 may be coupled with one or more deployment hinge assemblies 24, which may facilitate the extension of running board 22 into a deployed position as depicted in FIG. 1A, and the retraction of running board 22 into a stowed position as depicted in FIG. 1B. Deployment hinge assemblies 24 can also be constructed as would be known in the art and in at least one case may be connected to and controlled by controller 90 associated with motor vehicle 10 (FIGS. 7 and 8), as will be discussed in more detail below. It will be understood by those skilled in the art, however, that the illustrated running board assembly 20 and running board 22 embodiments are only exemplary and may take on a variety of alternative configurations, may serve a variety of purposes not necessarily addressed herein, and may be configured as stationary or extendable/retractable, and still fall within the scope of the present disclosure. In addition, the extending/retracting of running board 22 may be accomplished in a variety of ways as would be contemplated by a skilled artisan.

According to one embodiment, running board 22 may be coupled to a heat source for heating the top surface 28 of running board 22 to ensure proper traction for entry or exit into motor vehicle 10. For example, running board 22 may be coupled with a heating wire, hot air vent, or other heat source that may be contemplated by a skilled artisan to heat top surface 28 of running board 22 to melt ice or other frozen accumulation. In at least one case, running board 22 includes a heating element 26 embedded within the structure of running board 22, or otherwise disposed under or proximate top surface 28 and coupled to running board 22. Heating element 26 may comprise a resistive heating unit that provides radiant heat to an immediate area, including top surface 28 and projections 30, when energized. Heating element 26 may also be coupled to and controlled by a controller 90 (FIGS. 7 and 8) associated with motor vehicle 10 and in accordance with aspects described in more detail below.

Running board assembly 20 may also include at least one light source 34 and lens 36 for illuminating running board 22 with light 38. Light source 34 may be provided on any surface sufficient to illuminate running board 22. In some cases, the light source may be disposed on an under-carriage surface 33 of motor vehicle 10. In other cases, and depending on the configuration of the particular running board, the light source may be disposed on portions of the motor vehicle 10, such as a side panel or a door. In the illustrated embodiment, motor vehicle 10 includes a rocker molding or shoulder assembly 32 that projects out from a lower surface of motor vehicle 10 above running board 22. As shown in FIGS. 2 and 3, light source 34 and lens 36 may be disposed on an underside of shoulder assembly 32.

Light source 34 may provide different functions for motor vehicle 10. According to one embodiment, light source 34 may serve as an element in a frozen accumulation detection system. In such a case, light source 34 may project light on a surface of motor vehicle 10, for example on running board 22, such that a reflection level of the light can be measured to detect frozen accumulation, as described in more detail below. Light source 34 may also serve as area lighting to illuminate the region around running board 22. For example, when door 12 is opened, light source 34 may be illuminated to provide safety or general area lighting. Light source 34 may also serve as decorative lighting to generally illuminate the region around running board 22 at any time as would be configured by a controller 90 of motor vehicle 10 and understood in the art.

Light source 34 may include one or more Red-Green-Blue Light Emitting Diodes (RGB LED) to facilitate illumination of running board 22. In at least one embodiment, light source 34 includes a plurality of LEDs that may be energized together or separately. As known, RGB lights are additive color lights in which light of varying wavelengths—red, green, and blue—are added together in various combinations to produce a broad array of colors. In an RGB LED, there may be LEDs associated with red, green, and blue light, and the ability to emit light having varying colors occurs by energizing one or more LEDs at varying intensities. As recognized by one of ordinary skill in the art, the creation of varying colors may be accomplished by mixing the various LED colors in accordance with the Commission International d'Eclairage (CIE) standard, which characterizes color by a luminance parameter and color coordinates.

According to aspects described herein, light source 34 may be coupled to controller 90 of motor vehicle 10. Specifically, controller 90 may energize various LEDs associated with light source 34 to emit light of varying wavelengths, associated with varying colors. In at least one embodiment, the LEDs of light source 34 may be energized to produce light in the blue-violet spectrum, and having a wavelength of approximately 380 nanometers (nm) to 500 nanometers (nm). As described in more detail below, a reflection of this emitted light off of a surface of motor vehicle 10, such as off of top surface 28 of running board 22, may be measured and used as an indicator of frozen accumulation.

As known in the art, light behaves in a predictable manner. For example, if a ray of light could be observed approaching and reflecting off of a 100% reflective surface, such as a flat mirror, the behavior of the light as it reflects would follow the law of reflection. According to the law of reflection, the ray of light approaching the reflective surface is known as the incident ray (e.g., sunlight 50 in FIGS. 4A and 4B). The ray of light that leaves the reflective surface is known as the reflected ray (e.g., light 54 in FIG. 4A and light 60 in FIG. 4B). At the point of incidence, where the ray of light hits the reflective surface, a line can be drawn perpendicular to the surface of the mirror, known as a normal line (labeled "N" in FIGS. 4A and 4B). The normal line divides the angle between the incident ray and the reflected ray into two equal angles. The angle between the incident ray and the normal line is known as the angle of incidence (e.g., angle 51 in FIGS. 4A and 4B). The angle between the reflected ray and the normal line is known as the angle of reflection (e.g., angle 55 in FIG. 4A and angle 61 in FIG. 4B). According to the law of reflection, when a ray of light reflects off a surface, the angle of incidence is equal to the angle of reflection.

Figure 4B:
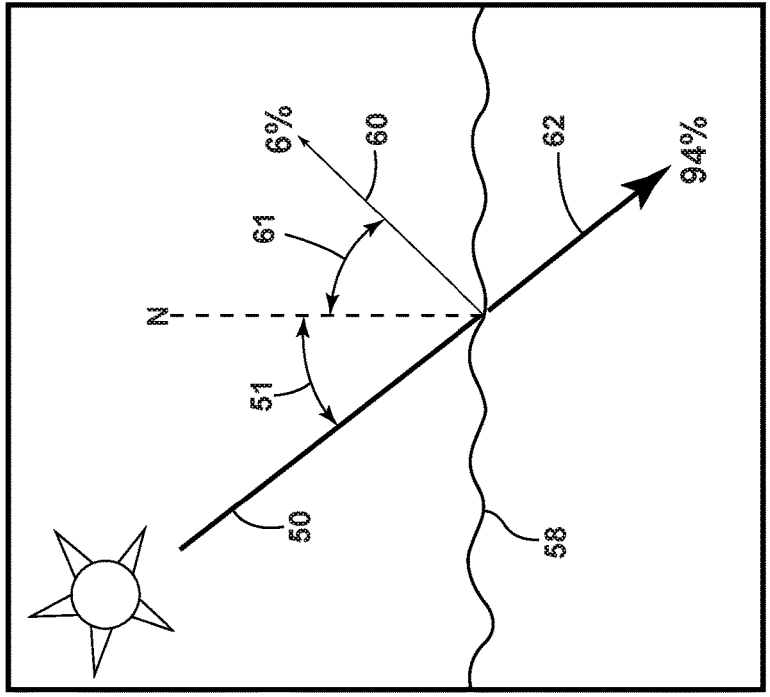
FIGS. 4A and 4B are diagrams depicting properties described herein.
Figure 4A:
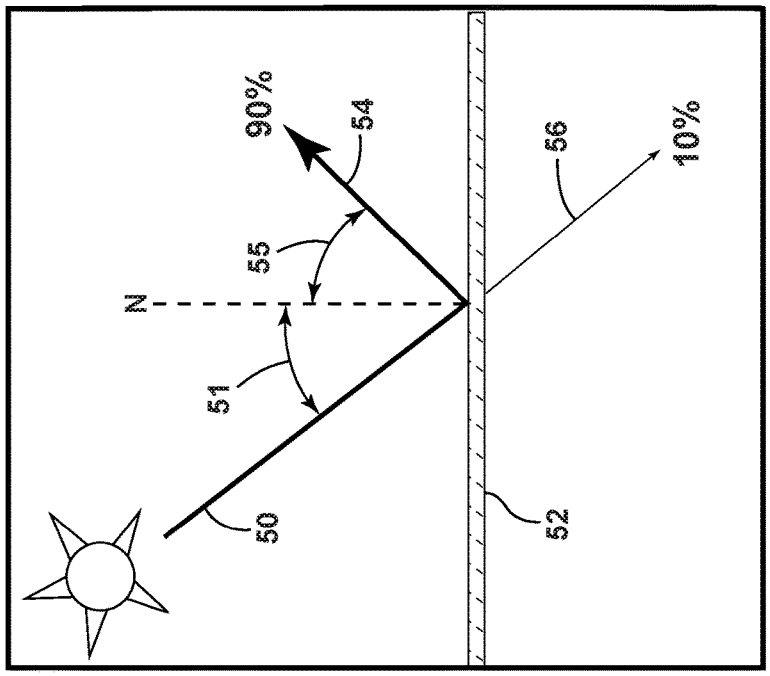

FIGS. 4A and 4B illustrate known properties of the behavior of light when the light interacts with two different types of surfaces that are not 100% reflective. Specifically, FIGS. 4A and 4B demonstrate how the amount of reflected light (or reflectivity) depends on, in part, the surface that the ray of light is reflected from. Referring to FIG. 4A, when light, such as sunlight 50, is directed toward ice 52, the amount of reflected light 54 is much higher than the amount of light that is refracted, scattered or absorbed, and not reflected, i.e., light 56. As shown in FIG. 4B, when the same light, sunlight 50, is directed toward water 58, the amount of light that is reflected, light 60 is much less than the amount of light that is refracted, scattered or absorbed, and not reflected, i.e., light 62. For example, in illustration of FIGS. 4A and 4B, when sunlight 50 hits ice 52, approximately 90% of the light is reflected while only approximately 10% is refracted, scattered or absorbed. When sunlight 50 hits water, approximately 6% of the light is reflected and approximately 94% of the light is refracted, scattered or absorbed.

Figure 5:
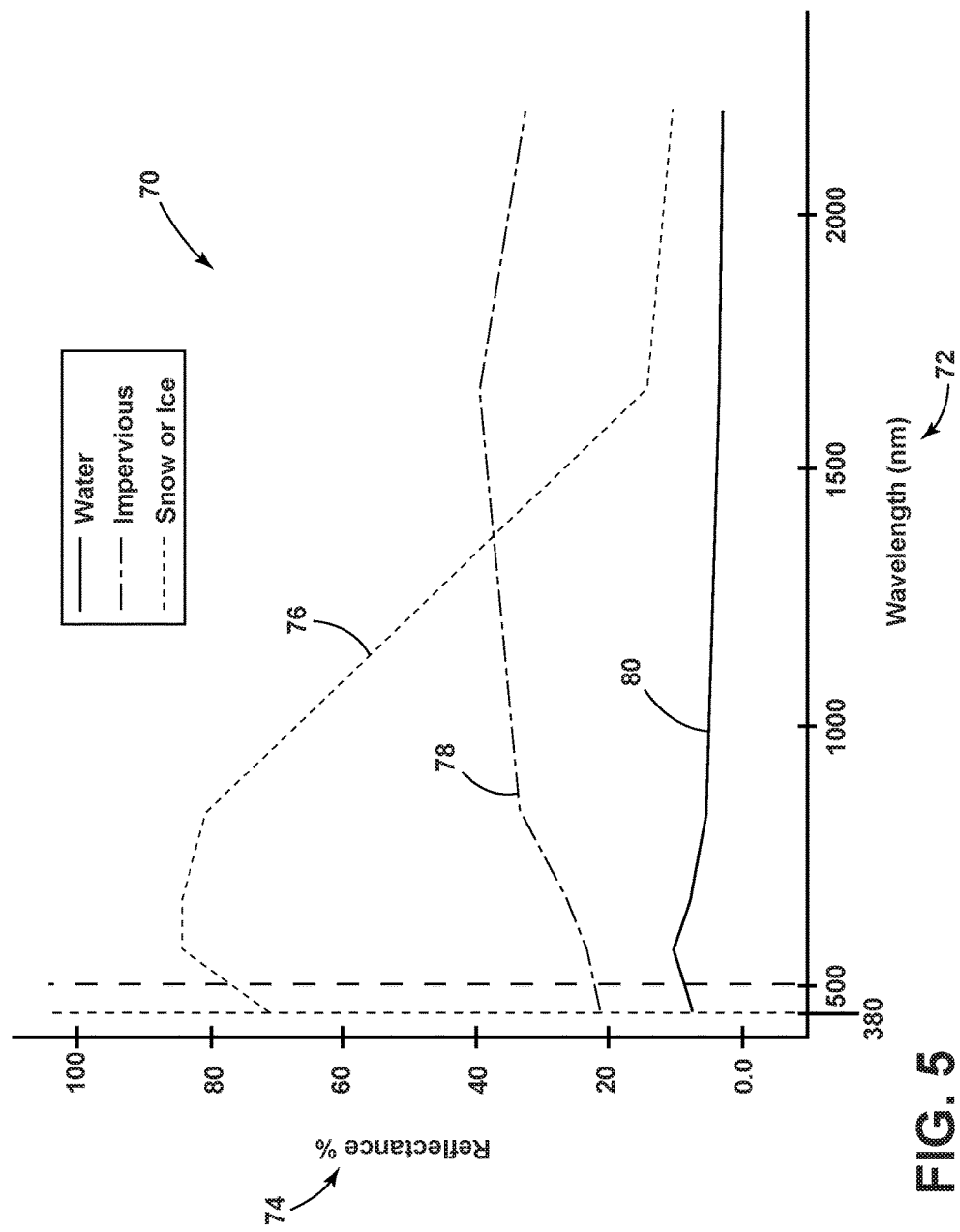
FIG. 5 is a graph depicting properties described herein.

Graph 70 in FIG. 5 is an exemplary graph that illustrates how reflectivity, i.e., reflectance level or a percentage of emitted light that is reflected, varies based on the type of surface and the wavelength of light that is projected on the surface, as is known in the art. In graph 70, the X-axis indicates light wavelength 72 and the Y-axis indicates the reflectance level 74 for various surfaces. Specifically, line 76 indicates frozen accumulation, such as snow or ice, line 78 indicates an impervious surface, such as dirt, and line 80 indicates water. As can be seen in graph 70, when a light is projected on a surface of snow or ice, the reflectance level, line 76—i.e., the amount of originally emitted light that is reflected—is high at lower wavelengths, specifically, in the wavelength 380 nm to 500 nm, corresponding to blue-violet light. More specifically, when blue-violet light is projected on snow and ice, graph 70 indicates that the amount of the projected light that is then reflected back is between approximately 60% and 80% of the original light. However, when blue-violet light is projected on an impervious surface, graph 70 indicates that the amount of the projected light that is reflected is between approximately 20% and 25% of the original light. When blue-violet light is projected on water, graph 70 indicates that the amount of the projected light that is reflected is even lower, or less than approximately 10%. Accordingly, graph 70 indicates that a light in the blue-violet wavelength spectrum will have a higher reflectance level when projected on frozen accumulation, such as snow or ice, than when projected on a surface of impervious matter or water.

Motor vehicle 10 may use these known properties of light and include provisions to detect an amount of light that is reflected off a surface of the vehicle. In one embodiment, running board assembly 20 includes at least one light sensor 42 that is configured to measure an amount of light that is projected into the sensor from a reflected light stream coming off of the top surface 28 of running board 22. More specifically, light sensor 42 may be configured to measure the intensity of reflected light when light source 34 emits a specified amount of blue-violet light. Light sensor 42 may comprise any type of photoelectric or photocell device known in the art, such as photovoltaic light sensors, photo-resistant light sensors, photo diode light sensors, or other type of lights sensor contemplated by a skilled artisan. In embodiments described herein, light sensor 42 may be coupled to controller 90 and capable of detecting a light intensity level for receipt by a controller 90.

Light sensor 42 may be disposed anywhere on motor vehicle 10 such that it can receive and measure the intensity of a reflected ray of light from an incident ray projected on a surface of the vehicle. In the illustrated embodiment, light sensor 42 is disposed in submarine configuration 40 to measure light 38 that is emitted from light source 34 and then reflected as reflected light 46 off of running board 22 (referring to FIG. 3). In some cases, light sensor 42 is located in a recessed cavity 44. Being located in a recessed cavity helps to limit sources of light other than light that is directly emitted from light source 34. In addition, light sensor 42 and controller 90 may be specifically configured to exclude non-reflected ambient light that might otherwise be detected in a measurement and contribute to a false-reading. For example, in one embodiment, light sensor 42 may be configured to filter light to measure only light of a specific wavelength, such as blue-violet light.

In other cases, however, light sensor 42 may be disposed on other portions of motor vehicle 10 in order to measure light reflected off of other surfaces of motor vehicle 10. When the light sensor is disposed in another area of the motor vehicle, other provisions may be present to ensure that other ambient light sources, such as sunlight, do not interfere with the light measurement such that only the reflection light coming from the emitting light source, such as light source 34, is sensed and measured.

Figure 6A:
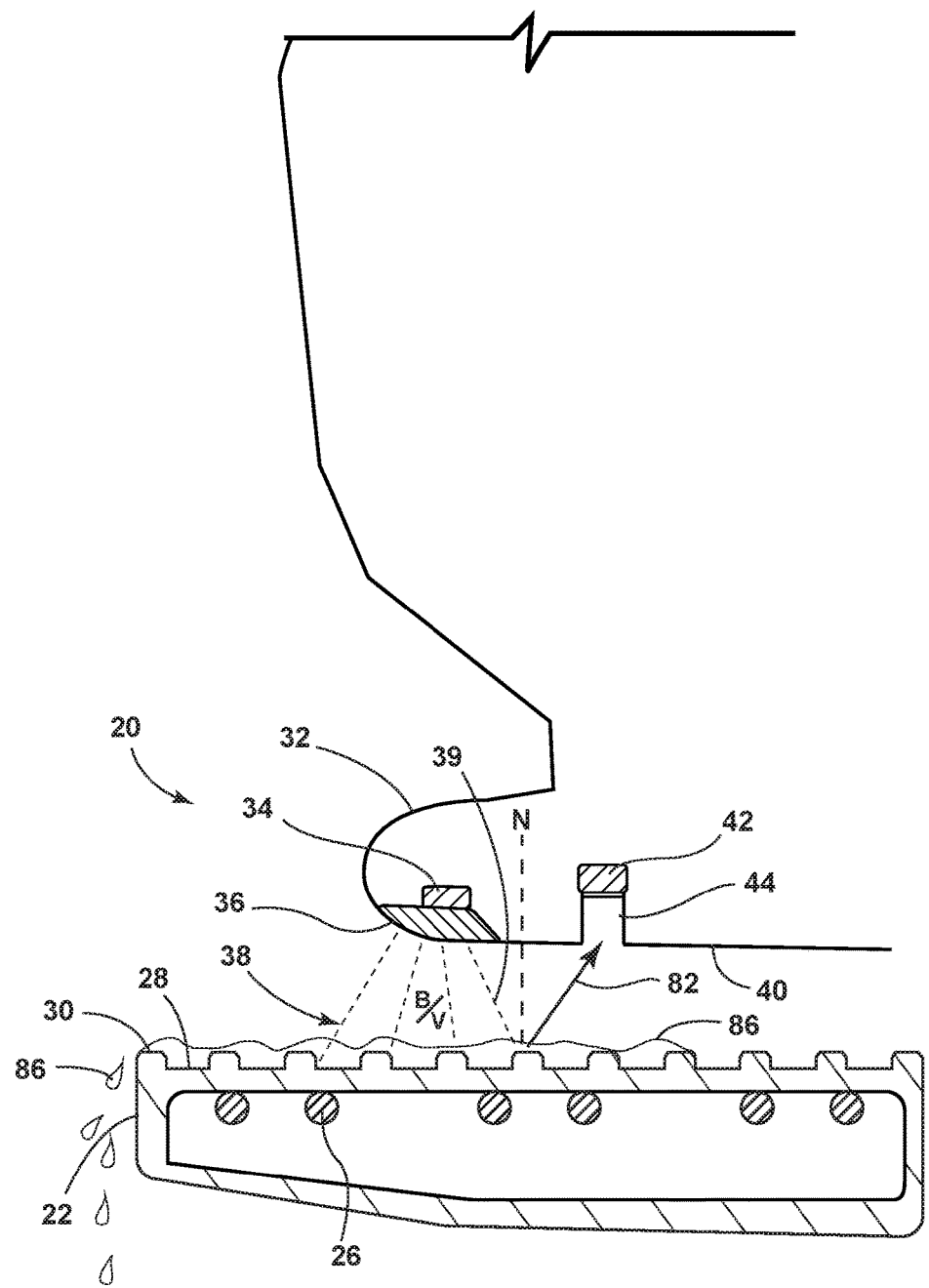
FIGS. 6A and 6B are cross-sectional views of a running board assembly having various elements disposed thereon, according to the embodiment.
Figure 6B:
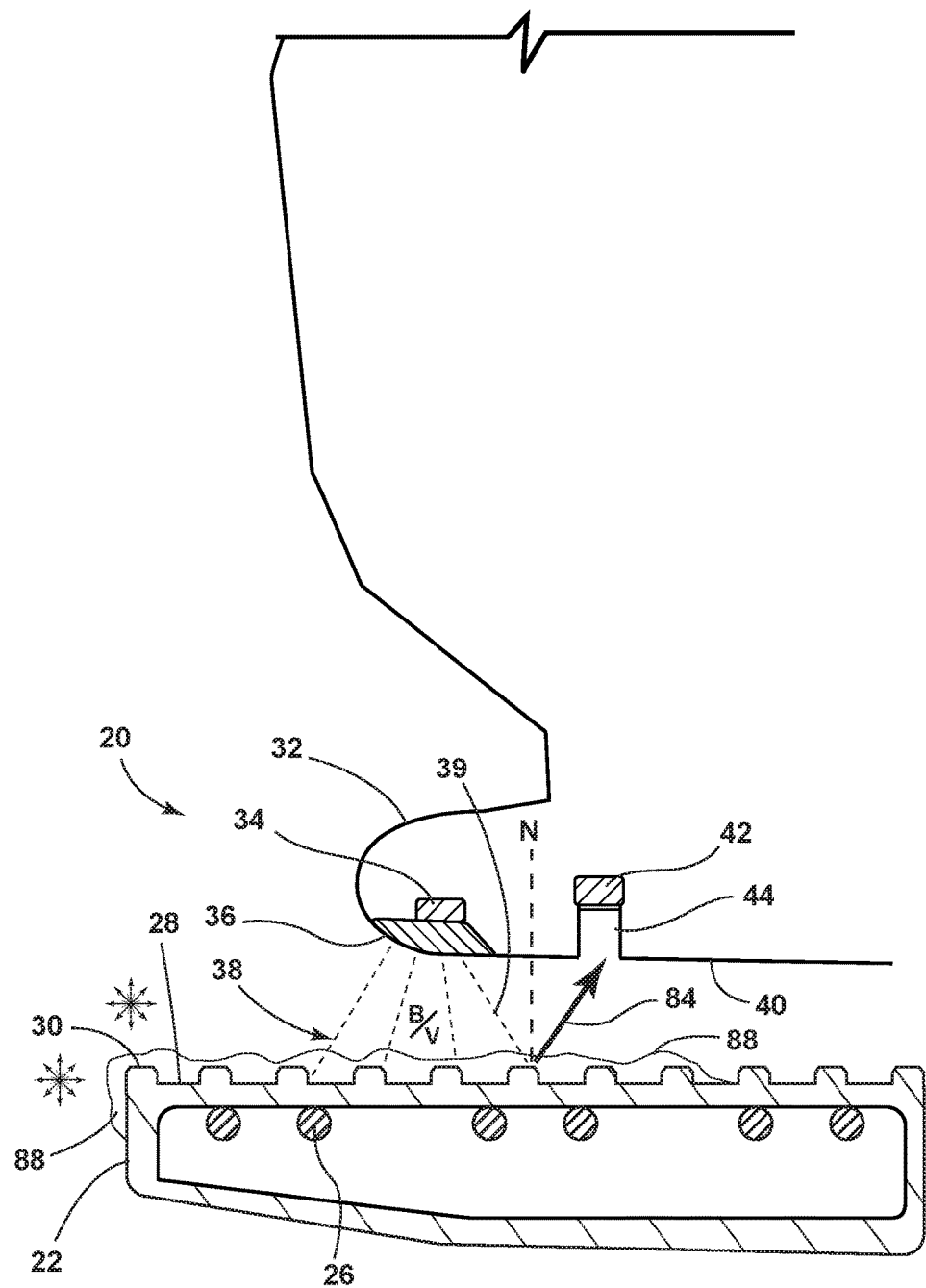

FIGS. 6A and 6B depict the light emission/sensing operation of running board assembly 20, and how the law of reflection may be utilized in practice to determine whether frozen accumulation is present on a top surface 28 of running board 22. In operation, one or more vehicle control operations (discussed below) may instruct light source 34 to emit or project a blue-violet light 38 on running board 22 when running board 22 is in a stowed position. As shown in FIGS. 6A and 6B, light 38 is projected such that an incident ray 39 is reflected directly into light sensor 42. When reflection is measured with running board 22 in a stowed position, variable sunlight or other light can reach the light sensor 42 preventing false-triggering or false-reading.

FIG. 6A depicts a running board 22 covered in an amount of water 86. When blue-violet light 38 is emitted from light source 34 against running board 22, incident ray 39 causes reflected ray 82 to be reflected into light sensor 42. According to aspects described below, controller 90 of motor vehicle 10 may be configured to associate the reflectance level of reflected ray 82, as measured by light sensor 42, with a specific accumulation on top surface 28, in this case, water 86. In contrast, FIG. 6B depicts a running board 22 covered in an amount of ice 88. When blue-violet light 38 is emitted from light source 34 against running board 22, incident ray 39 causes reflected ray 84 to be reflected into light sensor 42. Accordingly, in the illustrated embodiment, controller 90 of motor vehicle 10 may be configured to associate the reflectance level of reflected ray 84, as measured by light sensor 42, with a specific accumulation on top surface 28, in this case, ice 88.

Figure 7:
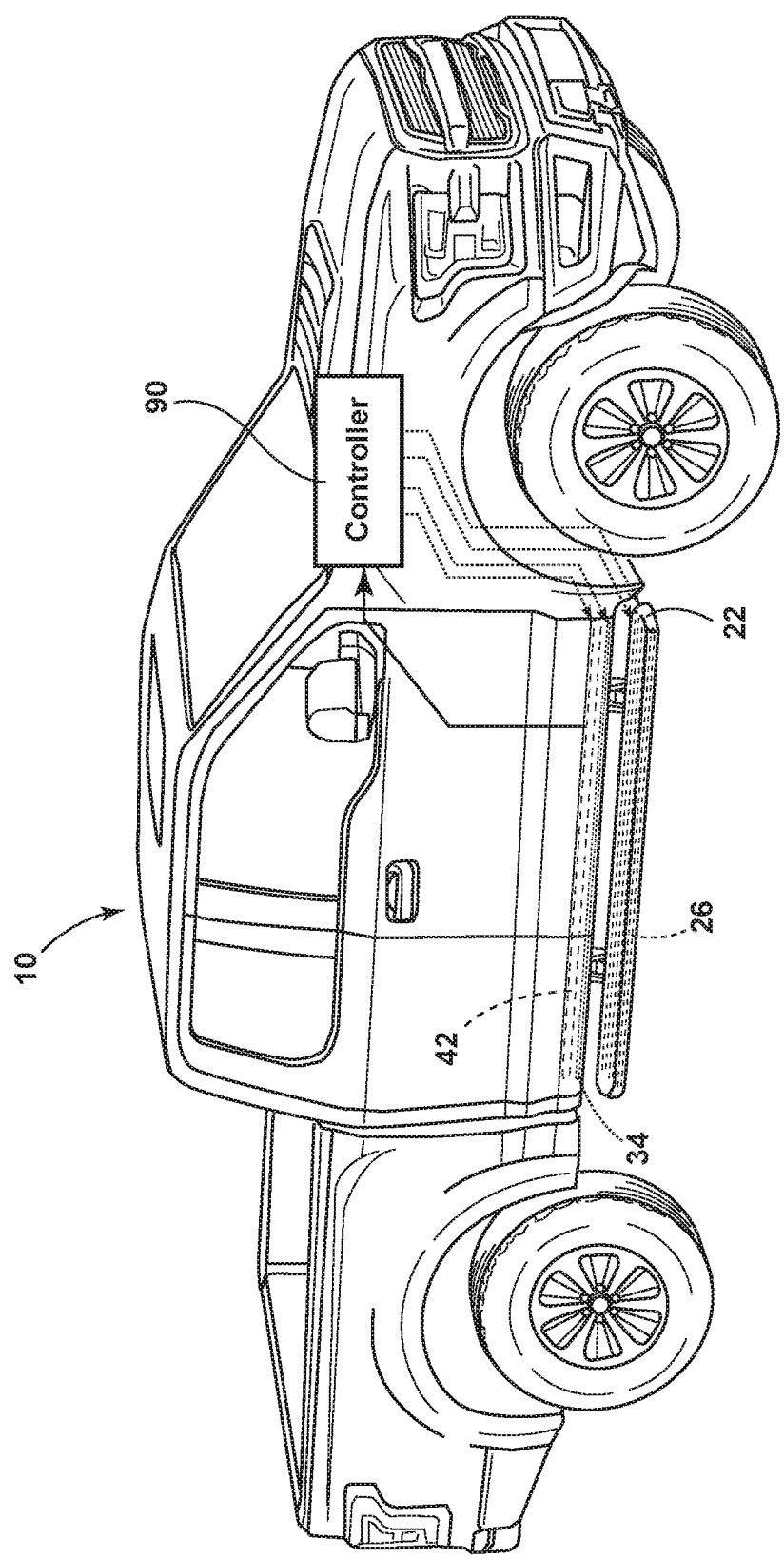
FIG. 7 is a diagram of a motor vehicle having a controller according an embodiment of the present disclosure.
Figure 8:
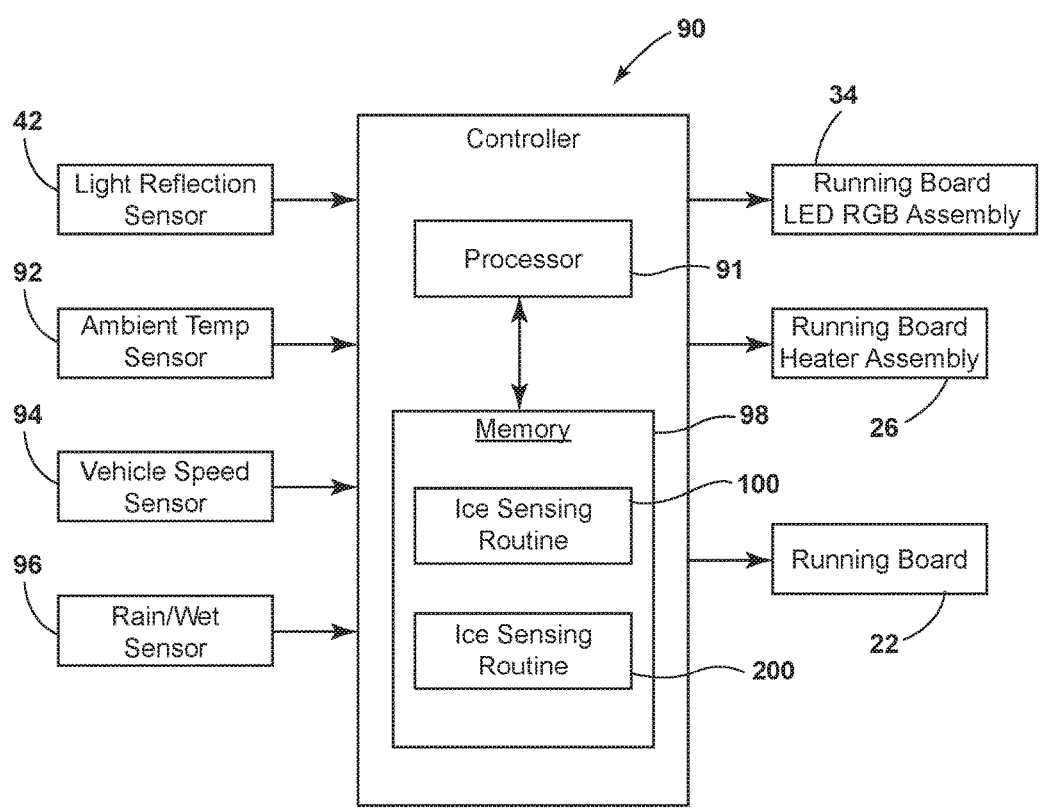
FIG. 8 is a diagram of a motor vehicle controller according to an embodiment of the present disclosure.

Referring to FIGS. 7 and 8, motor vehicle 10 may include controller 90 coupled to and configured to communicate with various components and systems of motor vehicle 10. FIG. 8 depicts a controller 90 according to at least one embodiment described herein. As shown in FIG. 8, controller 90 may be configured to receive inputs from components of motor vehicle 10, such as various sensors, and also to control a variety of components in motor vehicle 10, such as lights and automatically controlled devices. In the illustrated embodiment, controller 90 may generate various outputs and signals for control of running board assembly 20. Controller 90 may be configured as would be understood in the art, and at the very least includes a processor 91 and memory 98. Processor 91 may be configured to run various routines present in memory 98, such as routine 100 and routine 200. It will be understood and appreciated that controller 90 may include various other analog or digital circuitry that would be known in the art, and the depiction in FIG. 8 is for illustrative purposes only, and is simplified for understanding of the concepts pertinent to aspects described herein.

Controller 90 may be coupled to a variety of sensors configured to measure or detect ambient outside conditions and motor vehicle conditions. In at least one embodiment, motor vehicle 10 includes at least one light sensor 42 for sensing a reflectance level of light, as described above. Motor vehicle 10 may also include an ambient temperature sensor 92 for measuring an outside ambient temperature, a vehicle speed indicator or sensor 94 for measuring a speed at which motor vehicle 10 is traveling down the road, and a condensation or rain/wet sensor 96 for determining whether there is precipitation or other wetness in the outside environment. For example, rain/wet sensor 96 might determine wetness in the outside environment if motor vehicle 10 was wet from a car wash. It will also be appreciated that motor vehicle 10 may include a variety of other known sensors and mechanisms for gathering information for controller 90, or for controlling aspects of motor vehicle 10, including running board assembly 20, which are not discussed herein Controller 90 may be configured to request and/or receive inputs from the various sensors to make decisions and control aspects or various components of motor vehicle 10. In one aspect, controller 90 may receive a reflectance level from light sensor 42, an outside ambient temperature from ambient temperature sensor 92, a vehicle speed from vehicle speed sensor 94 and a wetness determination from rain/wet sensor 96. Such inputs may inform various control routines, such as routine 100 and routine 200, discussed in more detail below. The various inputs may also facilitate control of components, such as the deployment of running board 22 via deployment hinge assemblies 24, heating element 26 within running board 22, emission of light from light source 34, and sensing of light within light sensor 76.

According to embodiments described herein, memory 98 may store various processing routines that controller 90 may use to detect and prevent frozen accumulation on a surface of motor vehicle 10. For example, according to one embodiment, controller 90 may initiate ice sensing routine 100 to control running board assembly 20 and to detect whether frozen accumulation is present on running board 22. If frozen accumulation is detected, controller 90 may energize heating elements, additional or different warning lights for a passenger, or other indicator as would be contemplated by a skilled artisan. In at least one case, controller 90 energizes heating element 26 associated with running board 22. In another embodiment, controller 90 may initiate ice sensing routine 200 to control running board assembly 20 and to detect whether frozen accumulation is present on running board 22 and to heat running board 22 when frozen accumulation is detected, according to various parameters, described in more detail below.

Figure 9:
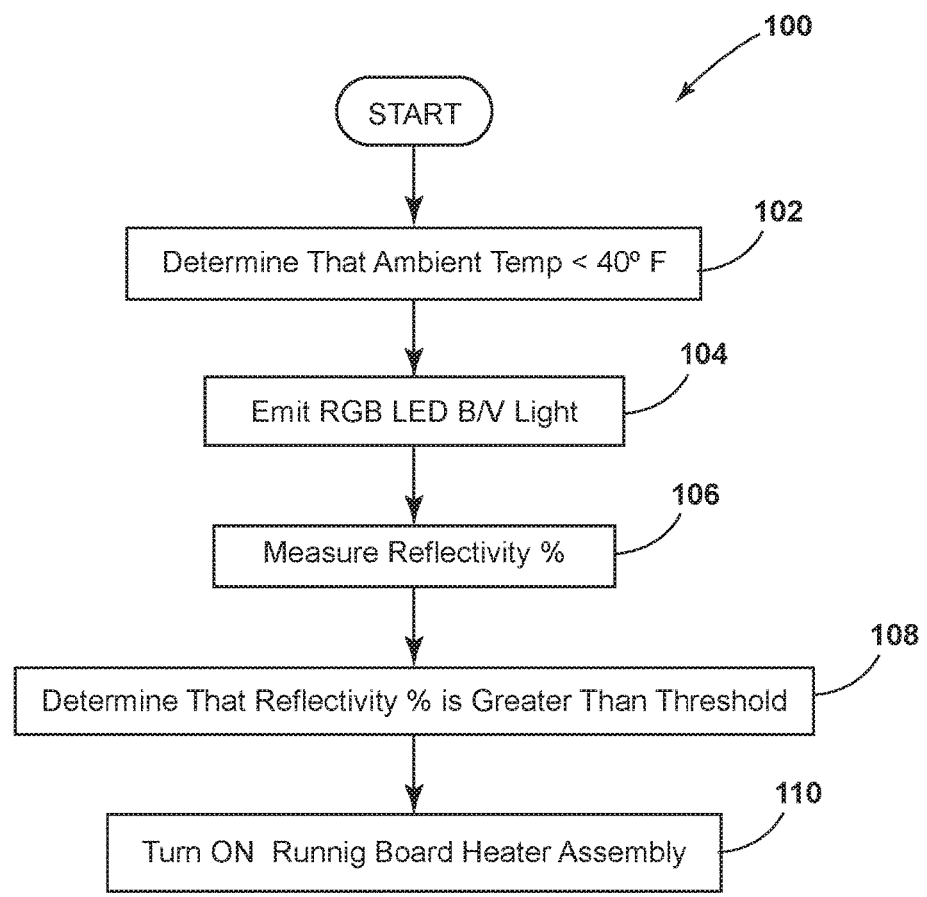
FIG. 9 is a flowchart depicting a method of sensing ice on a running board according to an embodiment of the present disclosure.

Referring to FIG. 9, routine 100 may be implemented by controller 90 according to one embodiment described herein. Specifically, at step 102, controller 90 first receives input from ambient temperature sensor 92 to determine whether an ambient temperature is less than 40 degrees Fahrenheit. If the ambient temperature is less than 40 degrees Fahrenheit, at step 104, controller 90 will energize light source 34, i.e., one or more RGB LEDs with blue-violet wavelength light along running board 22. At step 106, light sensor 42 will measure the reflectivity of the emitted light and send the measured reflectance level to controller 90. At step 108, if controller 90 determines that the reflectivity percentage measured by light sensor 42 is greater than a threshold reflectivity percentage, at step 110 the controller 90 will energize running board heating element 26.

The threshold reflectivity percentage may be set by one of skill in the art based on known reflectance levels of various surfaces. In at least one embodiment, as described in FIGS. 4A-5, when ice or snow is present on a surface, a threshold reflectivity percentage that may indicate the presence of snow or ice may be approximately 30%-60% reflectivity. In other words, e.g. at step 108 of routine 100, if controller 90 determines that a measured reflectance level is greater than approximately 30% reflectance, controller 90 may determine that frozen accumulation is present. In other cases however, a skilled artisan could set the threshold reflectivity percentage lower or higher based on testing of reflection levels on a particular surface when that surface is covered in ice, snow, or impervious matter.

Figure 10:
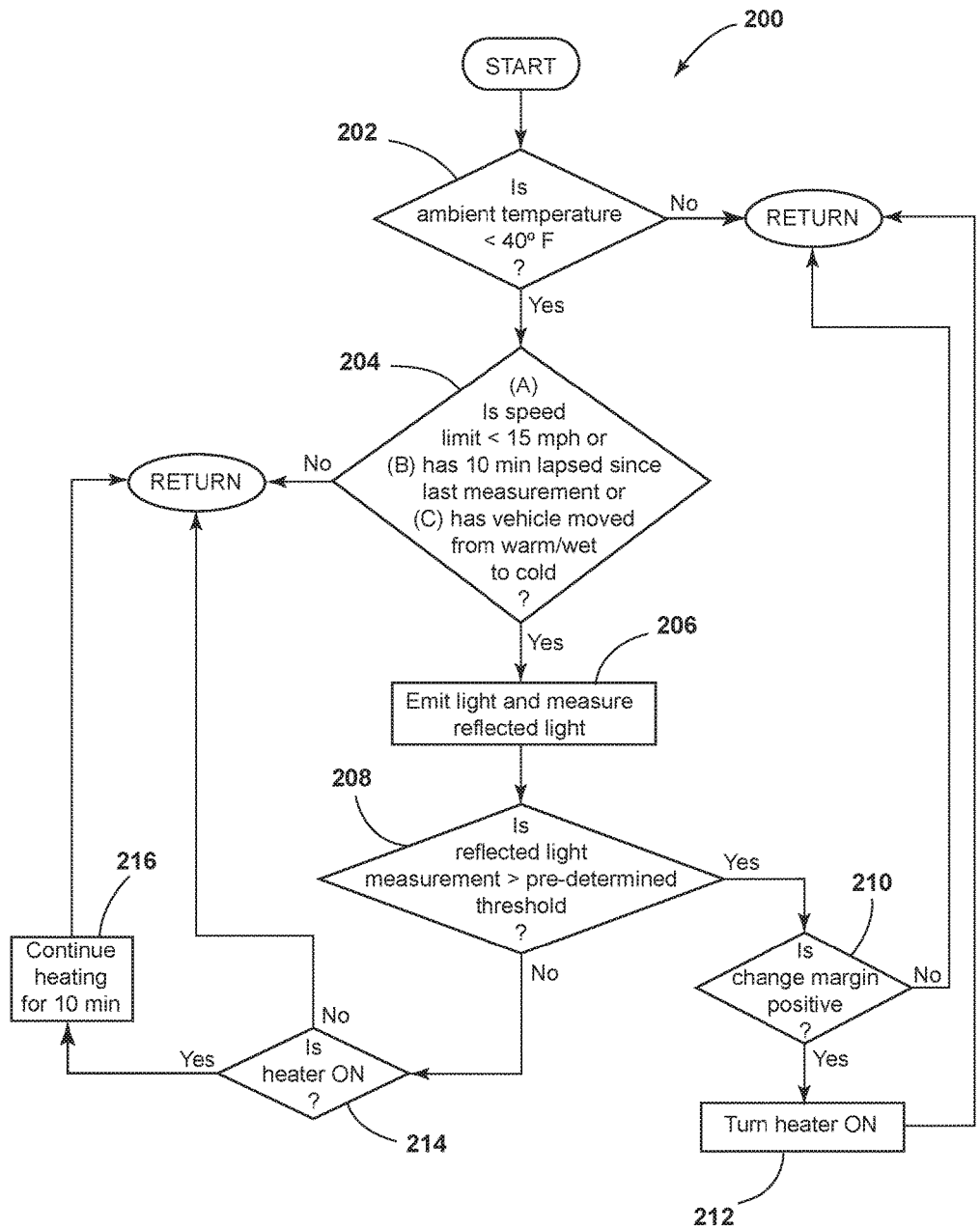
FIG. 10 is a flowchart depicting a method according to an embodiment of the present disclosure.

In some cases, it may be necessary to ensure a battery (not shown) of motor vehicle 10 is properly charged in order to support aspects of running board assembly 20, such as heating element 26. Referring to FIG. 10, ice sensing routine 200 may be implemented by controller 90 according to another embodiment described herein. At step 202, controller 90 may first determine whether the ambient temperature is less than 40 degrees Fahrenheit. If it is determined that the ambient temperature is greater than 40 degrees Fahrenheit the process returns to Start, however, if it is determined that the ambient temperature is less than 40 degrees Fahrenheit the process continues to step 204. At step 204, controller 90 may determine: a) if the motor vehicle speed is less than 15 MPH; b) if 10 minutes has lapsed since a last reflectivity measurement; or c) if the motor vehicle has moved from a warm and/or wet environment to a cold environment (the wet environment as determined by a rain/wet sensor, such as sensor 96). If none of conditions a, b, or c have been met the process returns to Start. However, if at least one of conditions a, b, or c have been met at step 204, the process continues to step 206 where the controller energizes light source 34 causing RGB LED blue-violet light 38 to emit on running board 22. Also at step 206, light sensor 42 measures the reflectance level or reflectivity of light 38 off of running board 22. At step 208, the process determines if the reflected-light measurement or reflectivity percentage is greater than a threshold percentage, indicating that frozen accumulation is likely, as described above.

If controller 90 determines at step 208 that the reflectivity percentage is not greater than a threshold percentage, the process determines, at step 214, whether the heater assembly 26 is currently energized (indicating recent frozen accumulation was detected). If the process determines that the heating element 26 is currently energized at step 214, the process moves to step 216 and continues energizing the heating element 26 for another 10 minutes. The continued heating gives water time to evaporate and disperse. After step 216, the process moves to Start again. However, if the controller determines at step 214 that the heating element 26 is not currently energized, the process returns to Start.

Referring back to step 208, if controller 90 determines that the measured reflectivity percentage is greater than a threshold percentage, and thus frozen accumulation is likely, the process moves to step 210. At step 210, controller 90 determines whether a battery of the motor vehicle 10 has a positive charge margin. If it is determined that the battery charge margin is negative, controller 90 determines that motor vehicle 10 does not have energy to energize heating element 26, and returns to Start. However, if controller 90 determines that battery charge margin is positive at step 210, controller 90 energizes heating element 26 on at step 212 to melt the detected frozen accumulation and then returns to Start.

It is to be understood that variations and modifications can be made on the structures and methods described herein without departing from the spirit and scope of the present disclosure. The description above is intended to be exemplary, rather than limiting and it will be apparent to those of ordinary skill in the art that many more embodiments and implementations are possible that are within the scope of the present disclosure. Accordingly, the embodiments are not to be restricted except in light of the attached claims and their equivalents.

What is claimed is:

1. A running board assembly for a motor vehicle comprising:
   a running board;
   a light source for emitting light on a surface of the running board;
   a light sensor for measuring a reflectance level of the emitted light off the surface of the running board; and
   a heating element coupled to the running board, wherein the heating element is activated when the measured reflectance level is greater than a threshold reflectance level.

2. The running board assembly of claim 1, wherein the running board is movable between a retracted position and an extended position.

3. The running board assembly of claim 1, wherein the heating element is disposed under a top surface of the running board.

4. The running board assembly of claim 1, wherein the heating element is a radiant heating element.

5. The running board assembly of claim 1, wherein the light source comprises an RGB LED light.

6. The running board assembly of claim 5, wherein the RGB LED light comprises light with a wavelength of approximately 380 nm to 500 nm.

7. The running board assembly of claim 1, wherein the light source is located on an underside surface of the vehicle.

8. The running board assembly of claim 2, wherein the light sensor is configured to measure the reflectance level when the running board is in the retracted position.

9. A system for detecting frozen accumulation on a surface of a motor vehicle, comprising:
   a light source configured to emit light on the surface of the vehicle; and
   a light sensor configured to measure a reflectance level of the emitted light off of the surface of the vehicle, wherein the measured reflectance level is compared to a threshold reflectance level to detect frozen accumulation.

10. The system of claim 9, further comprising:
    a heating element proximate the surface of the vehicle; and
    a controller configured to:
    receive the measured reflectance level of the emitted light; and
    energize the heating element based the comparison of the measured reflectance level of the emitted light to the threshold reflectance level.

11. The system of claim 10, wherein the controller energizes the heating element when the measured reflectance level is above the threshold reflectance level.

12. The system of claim 9, wherein the surface is a top surface of a running board.

13. The system of claim 9, wherein the light source is an RGB LED light.

14. The system of claim 13, wherein the RGB LED light comprises light with a wavelength of approximately 380 nm to 500 nm.

15. A method for removing frozen accumulation on a surface of a motor vehicle, comprising:
    emitting light on the surface of the motor vehicle;
    receiving a measurement of a reflectance level of the light off of the surface of the motor vehicle;

comparing the measured reflectance level to a threshold reflectance level; and when the measured reflectance level is greater than the threshold reflectance level, energizing a heating element proximate the surface of the motor vehicle.

16. The method of claim 15, wherein the surface of the motor vehicle is a running board.

17. The method of claim 15, wherein the light is an RGB LED light, and wherein the step of emitting light on the surface of the motor vehicle comprises:

emitting light with a wavelength of approximately 380 nm to 500 nm.

18. The method of claim 15, further comprising:
receiving a measurement of an ambient temperature; and
when the ambient temperature is less than 40 degrees Fahrenheit, emitting light on the surface of the motor vehicle.

19. The method of claim 18, further comprising:
receiving a speed limit measurement; and
when the speed limit measurement is less than 15 miles per hour, emitting light on the surface of the motor vehicle.

20. The method of claim 18, further comprising:
receiving a determination that the motor vehicle is wet; and
based on the determination that the motor vehicle is wet, emitting light on the surface of the motor vehicle.

* * * * *